United States Patent [19]

Tuijn et al.

[11] Patent Number: 6,058,207
[45] Date of Patent: *May 2, 2000

[54] SELECTIVE COLOR CORRECTION APPLIED TO PLURALITY OF LOCAL COLOR GAMUTS

[75] Inventors: Chris Tuijn, Lier; Earle Stokes, Berchem, both of Belgium

[73] Assignee: Agfa Corporation, Wilmington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,920

[22] Filed: Apr. 24, 1996

[30] Foreign Application Priority Data

May 3, 1995 [EP] European Pat. Off. ............. 95201140

[51] Int. Cl.$^7$ ................................. G06K 9/00; H04N 1/56
[52] U.S. Cl. ............................................ 382/162; 358/518
[58] Field of Search .................................. 382/162, 167; 358/518

[56] References Cited

U.S. PATENT DOCUMENTS

| | | | |
|---|---|---|---|
| 5,202,935 | 8/1997 | Kanamori et al. | 382/162 |
| 5,268,754 | 8/1997 | Van de Capelle et al. | 382/162 |
| 5,471,324 | 8/1997 | Rolleston | 358/518 |
| 5,473,736 | 8/1997 | Young | 395/131 |
| 5,548,697 | 8/1997 | Zortea | 358/518 |
| 5,552,904 | 8/1997 | Ryoo et al. | 358/518 |

FOREIGN PATENT DOCUMENTS

| | | |
|---|---|---|
| 0566914A1 | 10/1993 | European Pat. Off. . |
| 0441558A1 | 8/1997 | European Pat. Off. . |
| 0566914A1 | 8/1997 | European Pat. Off. . |
| 4343362A1 | 8/1997 | Germany . |
| 2117902A | 8/1997 | United Kingdom . |

*Primary Examiner*—Amelia Au
*Assistant Examiner*—Samir Ahmed
*Attorney, Agent, or Firm*—John A. Merecki; Edward L. Kelley

[57] ABSTRACT

A method is described for selective color correction of an original color image. In one embodiment, a color is selected by picking a colored pixel from the color image and a changed color, having a restricted color change, is associated with the selected color. All original colors, situated within a local color gamut, comprising the selected color, undergo a color modification according to the color change. The effect of the modification decreases as the original color reaches the boundary of the local color gamut. The selected color and changed color may be defined in the native color space, the local color gamut is preferentially defined by an action radius related to a psychometric color space. Two or more selective color corrections may be combined by a weighted mean modification, by choosing for each color change a weight value, which decreases as the selected color is more different from the original color.

17 Claims, 3 Drawing Sheets

SELECTIVE COLOR CORRECTION APPLIED TO PLURALITY OF LOCAL COLOR GAMUTS

FIELD OF THE INVENTION

The present invention relates to devices and methods for selective correction of original colour images. More specifically the invention is related to an apparatus and a method for defining a colour change influencing a restricted colour gamut.

BACKGROUND OF THE INVENTION

Colour images may be obtained by exposing photographic material to light reflected or transmitted by a natural scene and subsequent processing. It may be desirable to reproduce such colour images in large quantities, using methods of electronic image processing. To achieve such a reproduction, the colour image may be scanned by an electronic colour scanner, such as the Agfa SelectScan (SelectScan is a trade mark of Agfa-Gevaert N.V.). Such a scanner divides the image into adjacent square or rectangular picture elements or pixels, and usually assigns to each pixel three colour values, identified as the red, green and blue pixel value (RGB) respectively. By characterisation of the electronic scanner for colour images, each triplet of colour values RGB may be converted to a point within a device independent colour space, such as CIE-XYZ, CIE-L* u* v*, etc. After that transformation, each such point may be transformed to a device dependent triplet, 4-tuple, etc. of required stimulus values for an output device, such as a thermal dye colour printer, an electrophotographic colour printer, or an image setter for generating three, four or more separation films or printing plates, to be used in a colour printing process, such as lithography, flexography, offset, etc. Recently High Fidelity or HiFi colour reproduction systems have gained more attention. As such, images may be presented in a corresponding HiFi colour space, such as CMYKOG, meaning cyan, magenta, yellow, black, orange and green, where six inks having these colors are used in the printing process. An image as observed by the acquisition device, or any electronic image, given by its RGB colour values, device independent colour values or output device dependent stimulus values may be regarded as an original image.

It is possible that colours on the original scene or in the original image need to be reproduced differently than as they were captured. This may be due to inadequate illumination conditions, improper settings of the image acquisition devices in the chain, or colour changes which must be deliberately imposed on the original image. In such cases, specific colours need to be changed, while affecting other colours less dramatically. In a page layout program Adobe Photoshop version 3.0 (Adobe Photoshop is a trademark of Adobe Systems Incorporated which may be registered in certain jurisdictions) colour adjustments are available under a "variations feature", that allows easy adjustment of image colour and brightness by previewing and choosing from a range of colour options; adjustments for brightness, contrast and midtones (gamma); controls for selectively adjusting hue, saturation and brightness; adjustable tonal curves and control points on curves; replacement of colour for correcting the colour of a selected area by adjusting its hue, saturation and brightness values; selective colour correction for adjusting the ink values of individual colour channels or plates by entering absolute or relative values; independent colour balance adjustment for shadows, highlights and midtones. In this version, it is possible to change the vertices of the RGB cube, i.e. red, green, blue, cyan, magenta, yellow, black and white, by means of sliders. It is also possible to change a neutral or grey point in the colour space. The sliders are going from −100% to +100%, and can be set in an absolute or relative mode. In the relative mode, the percentage is relative to the amount of CMYK of the colour changed. In the absolute mode, the change is the amount of extra or less ink in percentage. Whenever a slider has been moved, the image is updated interactively.

The method described above has some shortcomings. First of all, it is not possible to indicate changes in an arbitrary chosen point. Furthermore, it is not possible to get control to what extent other colours are affected by the required change to the selected colour.

The Color Companion plug-in for Photoshop, distributed by Van Ginneken & Mostaard, offers a number of fixed transformations, called flavours. These fixed transformations are stored on disk. The user may interactively select a number of these transformations, and apply one after the other to obtain a most desired colour correction. The chain of transformations may be combined and treated as a new transformation, The disadvantage of fixed transformations is that the user cannot specify transformations in an absolute way, i.e. by specifying which selected colour should be changed. By applying the transformations one after the other, the latter transformations may be influenced by the previous. The elimination of one transformation in the beginning of the chain may influence other transformations considerably.

DE 43 43 362 A1 discloses a method for selective colour correction, by selecting a plurality of colours, defining for each colour a colour change, computing weighting values for each colour in a local colour gamut, according to the presence of a selected colour and a convolution matrix, or computing for each point within the local colour gamut a new colour change, by convolving the original colour changes with such a convolution matrix. A disadvantage with this method is that either the weighting values are not guaranteed to have value one at the selected colour, or that the new colour changes are not exactly the required colour changes in the selected colours, which may be derived from FIG. 10e and 12c respectively.

GB 2 117 902 A discloses a method for selective colour correction, in which a "sample", comprising a large amount of colours, is selected, a required colour change is given for that sample, and a weighting function is defined for computing colour modifications. According to this method it depends on the distribution of colours within the sample having the same lightness, which colour value $(1.x_0.y_0)$ will get the required colour change. This way, the interactive operator has no real control over a selected colour which must get a required colour change, since $x_0$ and $y_0$ are merely mean values for different x and y values corresponding to colour points in the original image having the same lightness.

EP 0 441 558 A1 also discloses a method for selective colour correction, in which a colour is selected and target colours are defined. According to this method it is not guaranteed that each selected colour will be corrected according to the target colour.

EP 0 566 914 A1 discloses a method for selective colour correction, by definition of a colour to be corrected, a target colour and an effective range. Although according to this method it may be guaranteed that selected colours are corrected to target colours, this method is silent about selective colour correction according to different target colours in which it is guaranteed that all selected colours are corrected according to the required target colour.

OBJECTS OF THE INVENTION

It is therefore a first object of the invention to provide a method for selective colour correction of an original colour image.

It is a further object of the invention to impose subjective colour changes on one or more selected colours and to influence a restricted set of similar colours accordingly.

It is another object of the invention to offer to an operator an unlimited scope of colours to be changed and their variations for the selective colour correction process, without dramatically increasing the processing time.

It is a specific object of the invention to provide a method, wherein discontinuities in colour transitions are not introduced by the selective colour correction process.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

Preferably a required change for each selected colour is specified along with its effect. Preferably, the value of each weighting function for a required colour change is bounded by zero and one. Such a weighting function has preferably the value one in the corresponding selected colour and preferably the value zero in all different selected colours. This has the important advantage over prior art systems that the operator gets what he wants, i.e. if the operator wants:

for selected colour $\vec{\mu}_1$ a required colour change $\vec{\delta}_1$, and for selected colour $\vec{\mu}_2$ a required colour change $\vec{\delta}_2$, then he will get such required colour changes for such colours in the original image, however close or distant the selected colours are from each other.

Preferentially, the weighting function extends over different colour points neighbouring the selected colour, i.e. there is at least one point different from the corresponding selected colour for which the evaluated weighting function gives a value different from zero. Outside a specific action radius or local colour gamut, centred around the selected colour, the weighting function has preferably the value zero. This concept has the advantage over the prior art that very few parameters must be stored in order to characterise a selective colour correction with an extent as large as a local colour gamut, i.e.: the coordinates of the selected colour, the coordinates of the colour change, one to six action radii (in a three-dimensional colour space for weighting function definition) and one to three or six shapes for the weighting function. It is not necessary to pick or compute each colour point within the local colour gamut, nor is it necessary to store a colour change for all colours within the local colour gamut. The colour changes are defined analytically, rather than discrete per colour in the colour space or local colour gamut.

In a preferred embodiment, the sum of all weight functions, evaluated in one original colour, is less than or equal to one. Usually, most weight functions will have a value zero, because the original colour is not within the local colour gamut. If the original colour is within the intersection of two (or more) local colour gamuts for two (or more) different selected colours, traditional methods may give a sum of weight values larger than one, which is not preferred according to the current invention.

In a preferred embodiment, each weight function is based on an extent and a shape. Both may be defined by an interactive operator, or automatically as discussed below. The extent gives the size of the area in which the weight function has non-zero values. The extent may be specified by the user as one or more action radii. If several action radii are defined, they are preferentially aligned each along a coordinate axis according to which the weight functions are defined. In order to define non-symmetrical local colour gamuts, two different action radii may be defined per coordinate axis. These action radii are preferentially defined in a "user-friendly" colour space, e.g. HSL, HSV or Lch. HSL stands for Hue, Saturation, Lightness; HSV stands for Hue, Saturation, Value, wherein Value basically corresponds to Lightness. Lch stands for Lightness, Chroma and Hue. Chroma basically corresponds to Saturation. Such "user-friendly" spaces have the advantage that a user has more "feeling" about which colours will be affected by the selective colour correction. In a preferred embodiment, the extent and shape of the weighting functions is defined in such a "user-friendly" space, whereas the selected colours and colour changes are defined preferentially in the native colour space of the original colour image, which is usually different from a "user-friendly" space.

The extent(s) may be entered by an interactive operator or may be computed in the following way. An operator may select a set or "cloud" of colours, all being designated to a same colour change. From this set of colours, a mean colour value is computed and this mean colour value acts as "selected colour". As such, locally only one colour is selected. If different colours need to be changed, other sets or "clouds" may give another mean colour value, which is used for determining the respective selected colours. For each such selected mean colour value, one required colour change is defined and one weighting function is established. The extent of the weighting function may be derived from the colour(s) within the cloud which is (are) most distant from the mean colour value. Preferably this distance is defined for each coordinate axis in the colour space separately. Therefore each colour value within the set or "cloud" and also the mean colour value is projected on the three coordinate axes. Preferentially, the action radius according to each axis is taken a the distance between the projected mean value and the projected colour value in the "cloud" most distant from the projected mean value. More preferentially, such distance is multiplied with a factor larger than 1, e.g. 1.1, to obtain the action radius. If for each axis one symmetrical action radius is required, then preferentially the maximum value of the action radii on both sides of the axis is taken. If one sphere-symmetric action radius is required, then preferentially the maximum action radius according to any coordinate axis is taken. Preferentially, the resulting action radius or radii is shown to the interactive operator, who may decide to increase or decrease its value. In this way, the extent of each weighting function may be set to comprise all colours contributing to said selected colour, i.e. the colours in the "cloud" used to compute the mean colour value, serving as selected colour.

Also the shape of the weight function may be determined by such a "cloud" of colours. Most generally, the shape of each weighting function is preferentially a non-ascending function along each coordinate axis, having a maximum value of 1.0 in the selected colour, and having a value 0.0 from the point up to where the extent of the weighting function is defined. If the "cloud" has a high distribution of colour points along one coordinate axis, then it is advantageous to keep the weight value from the weighting function along this axis as high as possible. If at a specific point suddenly no points are present any more in the cloud, then the weighting value should preferentially decrease rapidly and tend to zero. A such, the shape of the weighting function is based on the distribution of colours, within the "cloud", contributing to said selected colour.

The colour space which is used to define the selected colour, colour change or changed colour, and/or to compute the colour modification to an original colour is preferentially the same space as the colour space in which the original image is given, i.e. the native colour space. Such a native colour space may be RGB, Lab, CMY, CMYK, HiFi or a named colour space. A named colour space may be represented by a list of (key,value) items. The "value" may be coordinates in a specific colour space. Examples of named colour spaces are : Munsell, Pantone, etc. Examples of HiFi colour spaces are Pantone Hexachrome (trade name of Pantone Inc.), CMYKOG, etc. Such a space may be thus different from the space in which the shape and extent of the weighting function(s) are defined. The native colour space has the advantage that even very large colour changes may be defined and applied to the original image. Trying to define such a large colour change in a "device independent" colour space, would give problems when transforming the modified original colour to the native colour space. For example, if in a CMYK process the K value is increased by a factor of 200% for some reason, this may be well done in the CMYK space itself, but is hard to achieve via an intermediate colour transformation. According to the current invention, the original colour is transformed to the space according to which the weight functions are defined, the appropriate weight values are evaluated in that space. These weight values are used in the native colour space to weigh the colour changes and to add the weighted sum to the original colour, in order to get the modified colour.

The effect and the extent of the local colour gamut may be controlled by at least one action radius for each selected colour, or one action radius per coordinate axis in the colour coordinate system in which the local colour gamut is defined. Preferably the local colour gamut is substantially smaller than the gamut of the original image, i.e. the volume of the local colour gamut may be 1% or less than the volume of the total colour gamut of the original colour image. In another preferred embodiment, for each selected colour, a left and right action radius may be given for each coordinate axis, the size of each radius may be freely chosen. Outside the local colour gamut, as defined by one or more action radii, the modifications to original colours will be nihil or at least minimal. In a preferred embodiment, the selected colour and the changed colour are defined in the native colour space, i.e. the colour space in which the original colour image is given. This may be, as described before, RGB, CMY, CMYK, HiFi, etc. The action radii may also be given in that space. In a more preferred embodiment however, the action radii are defined in a HSL space corresponding to the native colour space. This gives a logical control over the range of colours to be affected, but still allows for exact selection of the colour to be changed and the amount of change in the native colour space, which is often RGB or CMYK.

In addition to the selected colour, the local colour gamut—identified by a set of action radii—and changed colour, a function may be specified that indicates the decrease of colour modification as the distance between the selected colour and the original colour increases. This function may be specified along the coordinate axes of the colour space in which the colours are expressed, or more preferably in an HSL colour space. Moreover, in a preferred embodiment, the form of the surface described by colours with equal weight factor may be chosen.

BRIEF DESCRIPTION OF THE DRAWINGS

The invention is described hereinafter by way of examples with reference to the accompanying figures wherein.

DETAILED DESCRIPTION OF THE INVENTION

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

Preferentially, the method according to the current invention may be implemented as a plug-in within the Photoshop environment, running on an interactive workstation, and is referred to as "FotoFlow Selective Colour Correction". This plug-in is copied to the Plug-ins folder of Photoshop. Preferentially, the AutoColorXT engine is copied to the ColorEngines folder of Photoshop.

Figure 1:
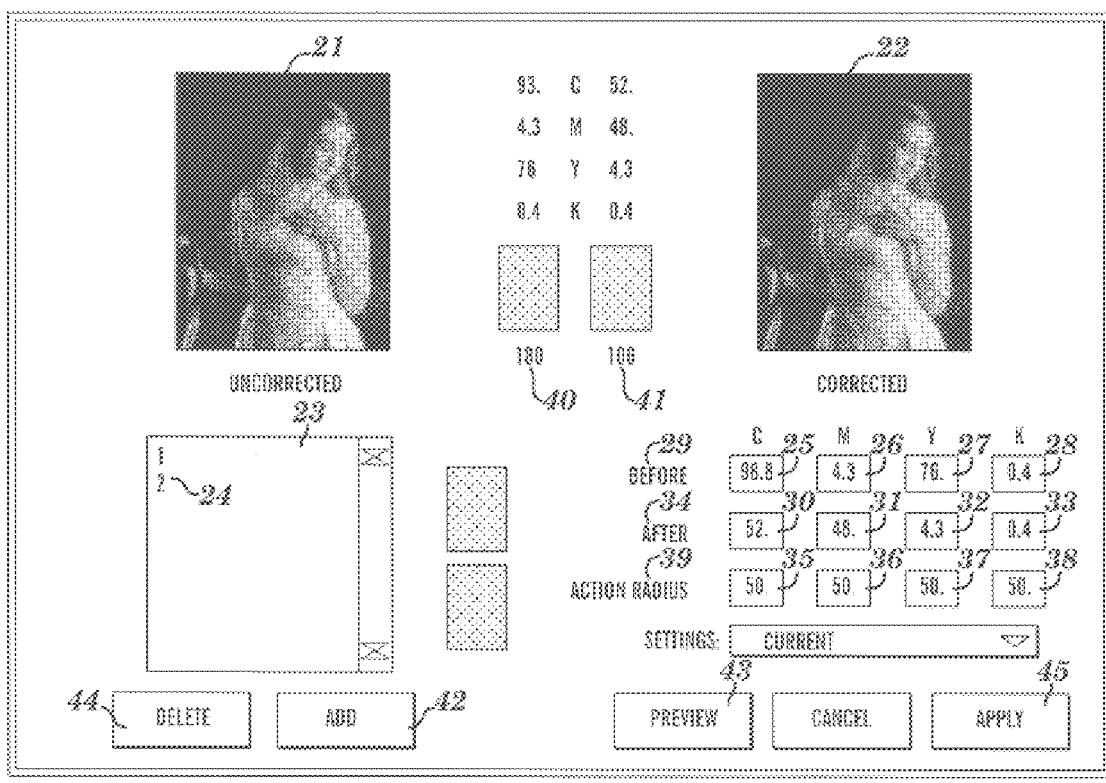
FIG. 1 shows a specific embodiment for carrying out the method according to the current invention.

The FotoFlow Selective Colour Correction (FSCC) plug-in may then be activated by selecting the ColorCorrection menu item in the FotoTune menu with respect to Filter. After activating FSCC, relevant portions of an image file are loaded from hard disk to display memory within the interactive workstation and shown on a colour video monitor, coupled to the interactive workstation, as a low resolution preview image (21), as shown in FIG. 1. This preview image, which will be further referred to as original preview (21), shows on the monitor original colours of the original colour image. Along with a preview of the original image, a changed or corrected version of the preview image is shown, which will be further referred to as corrected preview (22). At the start of the process, when no colours have been selected for conversion into a changed colour, the corrected preview (21) is identical to the original preview (22). Whenever a "preview button" (43) is activated, the corrected preview is computed from the original preview and the required changes.

A list box (23) is presented. This box contains a sequence number (24) for each selected colour. By pointing with a cursor to a specific sequence number (24) within the list box (23), the cyan, magenta, yellow and black colour values (25, 26, 27, 28 respectively) of the selected colour are shown in a "before" field (29), along with the cyan, magenta, yellow and black colour values (30, 31, 32, 33 respectively) of the corresponding changed colour in an "after" field (34). The corresponding action radii with respect to the cyan, magenta, yellow and black coordinate axes (35, 36, 37, 38 respectively) are displayed in an "action radius" field (39).

These four action radii are the components of a four-dimensional action radius vector within the CMYK space. In the example according to FIG. 1, the original colour and the changed colour are represented by their cyan, magenta, yellow and black components. Also the action radii are defined along the respective cyan, magenta, yellow and black coordinate axes. These CMYK values are ink values, given in percentage of full coverage by each specific ink. By adding the four given percentages, a value for the total amount of four inks may be displayed as total ink value for the selected colour (40) and total ink value for the changed colour (41).

Figure 2:
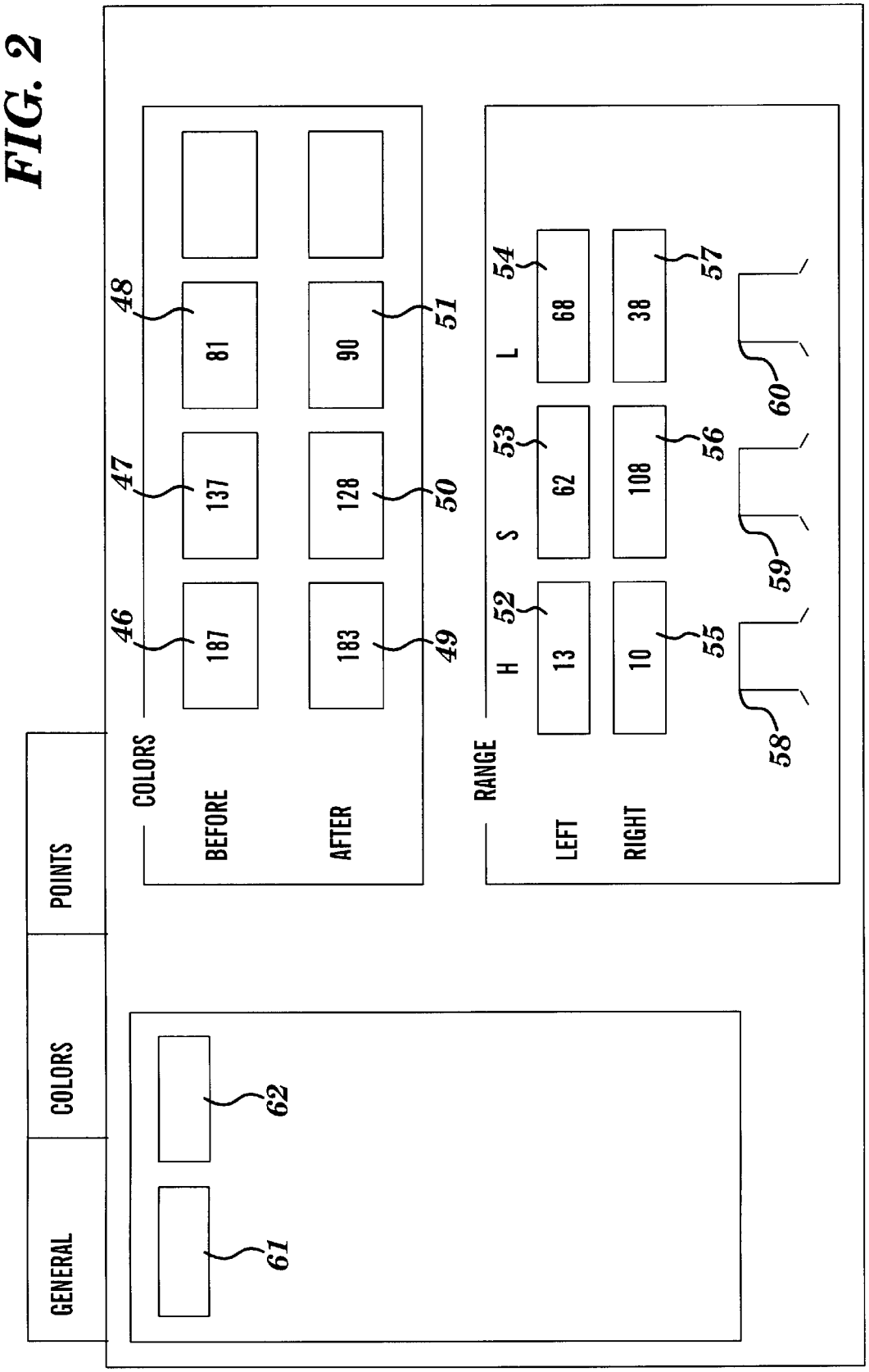
FIG. 2 shows an alternative user interface for choosing a selected colour, a changed colour, action radii and corresponding weight functions; and, FIG. 3 shows another alternative user interface for choosing a local colour gamut.

Alternatively, as shown in FIG. 2, the selected colour and the changed colour may be defined by their colour components in another device dependent system, such as the RGB space, corresponding to a specific colour scanner. The "before field" gives the colour value for the red, green and blue component (46, 47, 48 respectively) of the selected colour. The visual appearance of the selected colour is represented in box (61). This selected colour has to undergo a colour modification such that it looks like the changed colour (62). The colour values for the red, green and blue components (49, 50, 51 respectively) of this changed colour are displayed in the "after field". The definition of the local colour gamut is done in the HSL space. To find the reference or "centre" point for the local colour gamut in the HSL space, colour values for the selected colour, specified in an RGB colour space, may be converted to a cylindrical HSL space, wherein H stands for a hue angle, S for saturation radius and L for lightness, orthogonal to the circular HS-plane. The HSL space has the advantage that colours and colour differences may be assessed more subjectively. The previous colour spaces are device dependent. The local colour gamut is preferentially defined as a volume comprising the selected colour. For a volume defined in an orthogonal coordinate system, such as in the RGB, CMY or CMYK space as in the previous example, the points of intersection of coordinate axes through the selected colour may be specified by the operator as "action radii". According to these points of intersection, a convex volume such as a cuboid or ellipsoid is constructed. If surfaces are constructed having equal weight factor, these have preferentially also a convex shape. If the coordinate system is cylindrical, such as the HSL system, the local colour gamut is preferentially delimited by two planes of constant hue angle ($H_1$ and $H_2$), two planes of constant lightness ($L_1$ and $L_2$) and two concentric cylinders of constant saturation ($S_1$ and $S_2$). The first or left hue angle $H_1$ is defined by the hue of the selected colour and the action radius in the direction of a negative hue angle (52), specified by the operator. The second or right hue angle $H_2$ is defined by the hue of the selected colour and the action radius in the direction of a positive hue angle (55), specified by the operator. The first or left lightness $L_1$ is defined by the lightness of the selected colour and the action radius along the negative direction of the lightness axis (54), specified by the operator. The second or right lightness $H_2$ is defined by the lightness of the selected colour and the action radius along the positive direction of the lightness axis (57), specified by the operator. The first or left saturation $S_1$ is defined by the saturation of the selected colour and the action radius along a direction towards the origin of the saturation axis (53), specified by the operator. The second or right saturation $S_2$ is defined by the saturation of the selected colour and the action radius along a positive direction of the saturation axis (56), specified by the operator.

The operator may also specify a weight function, for specifying the effect of a colour change—defined on a selected colour—on a specific original colour within the local colour gamut. A different weight function may be defined for each coordinate axis in which the action radii are given. The weight function applicable to difference in hue angle between the original colour and the selected colour (58) allows the operator to specify how much an original colour, having a hue angle $H_o$, will undergo the colour change of a selected colour, having hue angle $H_s$. The difference $H_o$–$H_s$ is set out on a horizontal axis under the curve (58), with the origin under the maximum of the curve, and the weight value is proportional to the height of the curve. In the same way, the operator may select or specify the weight function applicable to the saturation difference between the original colour and the selected colour (59) and the weight function applicable to the lightness difference between the original colour and the selected colour (60). The way how these weight functions are used to compute a colour modification for an original colour is set out below.

The colour values of the selected colour (61) and the changed colour (62) according to FIG. 2 may also be expressed in a device independent or standard colour coordinate system, such as defined by the CIE commission (Commission Internationale de l' Eclairage). This commission defined device independent colour spaces which are suitable for representing colours in a method according to the current invention, such as CIE-L*a*b*, which is a psychometric colour space. In a preferred embodiment, the selected colour and changed colour may be given in the CIE-XYZ, CIE-xYz or CIE-L*a*b* coordinate system, whereas the action radii are preferentially given in a polar or cylindrical CIE coordinate system, such as CIE-Lch.

If the subsequent printing process uses only cyan, magenta and yellow inks, the selected colour and the changed colour may also be given by their respective cyan, magenta and yellow components only. If the original image is given in terms of a HiFi colour space, then it is preferred to convert the colour values of each image pixel to a standard device independent colour space, such as CIE-L*a*b*. All the above mentioned colour spaces are almost equivalent in this sense that each selected colour and each changed colour may be given a set of three or four coordinate values, that are fully descriptive for these colours. Mainly the experience of the operator of the program is decisive for which coordinate system is preferably used. If the operator is used to work with additive colours (RGB), he will prefer a device dependent coordinate system, dependent on the colour scanner or even on the colour video monitor. If the operator is used to think in terms of process inks (cyan, magenta, yellow and optionally black), he will prefer a CMY or CMYK colour space. If he is used to standardised device independent colour spaces, such as those defined by the CIE, he will prefer one of these colour spaces. Unlike the definition of the selected colour and the changed colour, the selection of the coordinate axes for defining the action radii has a more serious impact on the corrected preview. The action radii are descriptive for the local colour gamut comprising the selected colour, and thus define the set of original colours which will be affected by a modification. Also the extent of the modification of each original colour depends on the coordinate system to which the action radii are related to, as will be discussed in more detail below.

Returning back to FIG. 1, the CMYK colour values of a selected colour may be used as a starting point for the CMYK colour values of the corresponding changed colour. The colour values of the selected colour may be entered numerically via a keyboard connected to the interactive workstation, or these colour values may be picked by a cursor from a specific location on the original preview (21), on which the selected colour appears. The total ink value for the selected colour (40) is computed by the interactive workstation and displayed on the video monitor. By activation of an "add button", i.e. by moving the cursor, commanded by an electronic mouse connected to the interactive workstation, towards an "add field" (42) on the video monitor and clicking a mouse button, the CMYK values of the selected colour (25, 26, 27, 28) are copied to the CMYK values of the changed colour (30, 31, 32, 33). The values for the action radius (35, 36, 37, 38) are initialised with a suitable default value. The colour values of the changed colour may now be changed freely. Also the values for the action radii may be changed to more adequate values. The resulting modifications may be visualised by moving the cursor to the "preview field" (43) and clicking the electronic mouse.

The above actions may be repeated for several selected colours, each time selecting a selected colour, defining a corresponding changed colour and giving one or more action radii, descriptive for a local colour gamut comprising the selected colour. Each selected colour along with the other attributes is stored in a list, which is represented within the list box (23). A selected colour, along with its other attributes, may also be deleted from the list, by selecting it within the list box (23) and by use of the "delete field" (44). The list of selected colours and attributes may be saved in a file on hard disk for a deferred application to the entire original image or for later use, whenever the program is restarted. The selective colour correction defined by the list of selected colours and attributes may also be applied directly to the entire original colour image, by activation of the "apply field" (45). What this application implies is described more in detail below.

Figure 3:
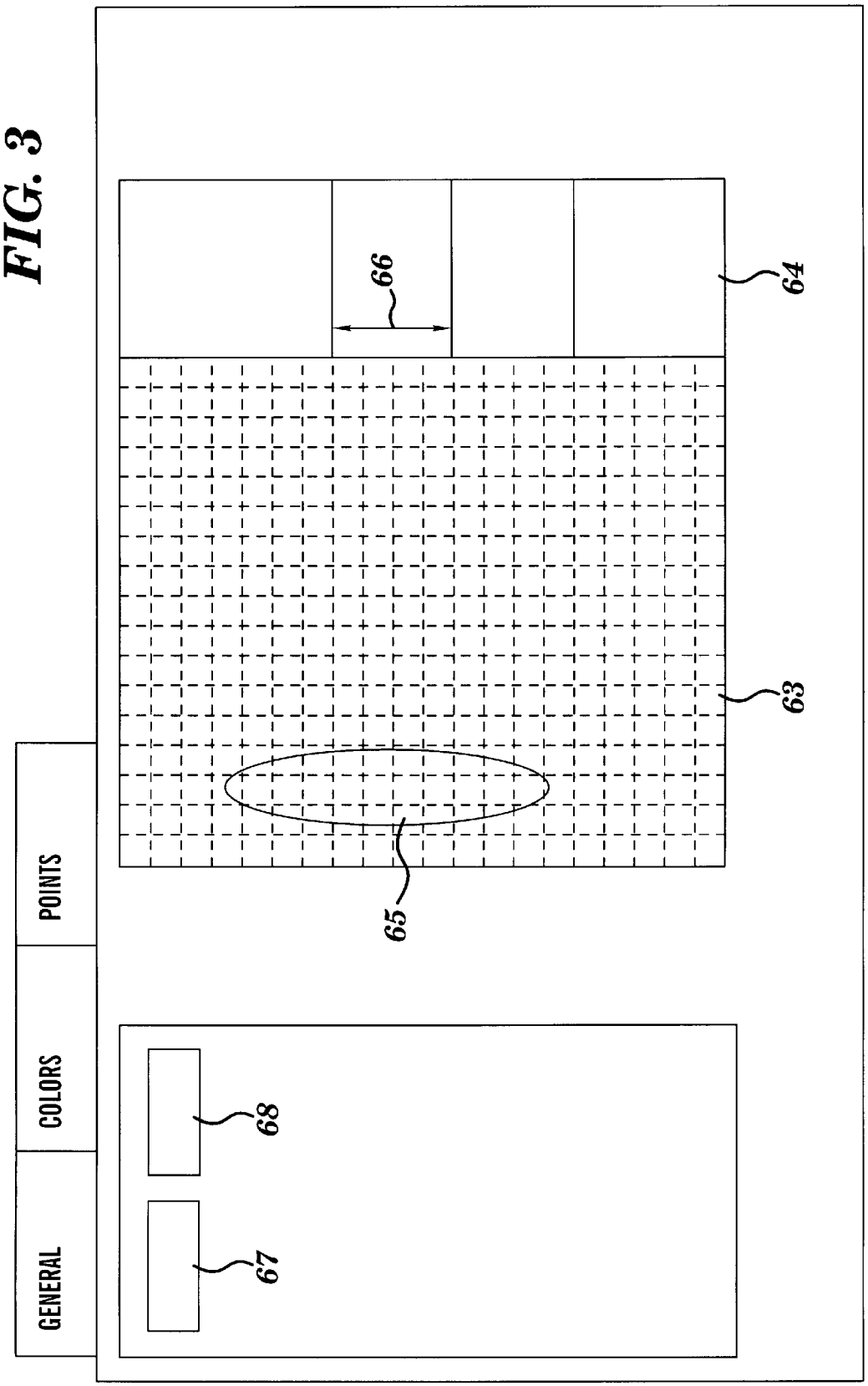

In FIG. 3 the impact of the local colour gamut is shown. On a hue—saturation plane (63), displaying a full gamut of all possible combinations of hue and saturation at constant lightness, a curve (65) displays the projection of the local colour gamut in the hue—saturation plane. This way, the operator may assess interactively the extent of the local colour gamut in the hue and saturation dimensions. In order to give feedback about the extent in lightness of the local colour gamut, a lightness axis (64) displays a projection (66) of the local colour gamut on this axis. On this diagram, also the selected colour (67) and the changed colour (68) are visualised.

Once the modifications for original colours may be computed based on the selected colour, the changed colour, the action radii and the weight functions, these modifications may be incorporated in a global colour transformation. Several application programs are available for transforming the colour values of pixels of an input image, to obtain an output image, wherein the output pixels have output colour values. One of such programs is a program called Photoshop, which is a trade mark of Adobe Systems Inc. The Photoshop application allows the introduction of a plug-in. Such a plug-in may be regarded as a procedure that may modify data structures managed by the Photoshop application. The input image may be such a data structure, modified by the plug-in to give an output image, which is another data structure for Photoshop. One such plug-in is "colormatcher exporter", within the "FotoTune" frame work (both are trade names of Agfa-Gevaert N.V. in Mortsel, Belgium), which transforms RGB data signals, obtained e.g. by scanning an original by a colour scanner, to CMYK data signals, ready for the printing process, making use of ColorRendering dictionaries in a PostScript level 2 environment (PostScript is a trade name of Adobe Inc.). The "colormatcher exporter" makes use of a transformation table. This table, referred to as a ColorLink, may be obtained by combination of a ColorTag for the scanning unit and a ColorTag for the recording unit. ColorLink and ColorTag are trade names of Agfa-Gevaert N.V. The transformation table gives the CMYK values for specific RGB values, arranged on a sparse grid. This means that not every RGB combination may be found in that transformation table, for obtaining a transformed value. The transformation for RGB values between the grid points may be found by some form of interpolation. It is now possible to modify such a transformation table according to the required colour modifications for the original colours. This way of working has the advantage that the usual global colour transformation (e.g. RGB to CMYK) is combined with the selective colour correction, and applied in one colour transformation step to the image. This saves a considerable amount of processing time. In a preferred embodiment, the grid lines of such a sparse table are selected such that the selected colours are situated on the intersection of such grid lines. More preferentially, the grid lines are more concentrated in the neighbourhood of such a selected point, or within the local colour gamut.

In a preferred embodiment, the parameters for selective colour correction are obtained interactively. Preferably, the original colour image is shown on the screen of a colour video monitor. The selection of the colour that has to be changed may then be done by pointing to a pixel within the original colour image having that selected colour. The selected colour may also be picked from a hue—saturation plane (63) as shown in FIG. 3. Alternatively, the colour values of the selected colour may be given by keyboard strokes or by sliders. The colour values of the required changed colour may also be given numerically, or be retrieved from a slider or, more preferentially from a reference image or from a hue—saturation plane (63) as shown in FIG. 3. Such a reference image is a colour image having colours as they should be for the original image after selective colour correction.

Once the parameters for the selective colour correction have been defined, the colour correction may be applied to an original colour image, which is represented by three or more colour values per image pixel, the colour values referring to a particular colour space. The colour corrections will have a local character, due to the definition of a local colour gamut as discussed above. The pixels within the original colour image, having a colour outside all local colour gamuts, will not have any modification applied to. If more than one colour is selected to undergo a colour change, preferentially first an isolated modification for an original colour is computed according to each selected colour, followed by the computation of a combined modification for that original colour, by averaging all isolated modifications for that original colour. Each original colour will thus undergo a combined modification.

If the original colour lies outside all local colour gamuts, this combined modification is preferentially nihil;

if the original colour lies within just one local colour gamut, this combined modification is preferentially equal to an isolated modification;

if the original colour lies within N local colour gamuts, this combined modification will be a weighted sum of N isolated modifications.

First will be discussed how an isolated modification is preferentially computed. Three objects must be defined:

the selected colour, which may be described as a set of colour values within a specific n-dimensional colour space, defining a point in that space, indicated as $\vec{\mu}=(\mu_1,\ldots,\mu_n)$;

the changed colour, which may be described in the same way as the selected colour. The changed colour may be given by absolute colour values or, which is equivalent, by values relative to the selected colour, indicated as colour change $\vec{\delta}=(\delta_1,\ldots,\delta_n)$ The changed colour is thus: $\vec{\mu}+\vec{\delta}$;

at least one action radius "vector", having a component in each coordinate direction: $\vec{\sigma}=(\sigma_1,\ldots,\sigma_n)$. The action radius components $\sigma_1,\ldots,\sigma_n$ may be given in a colour space, different from the native colour space, in which preferentially the selected colour is specified. If an asymmetric action radius is required, two action radii are defined: $\vec{\sigma}_l$ and $\vec{\sigma}_r$. The action radius defines the local colour gamut comprising the selected colour. If the components of the action radius vector are equal, specification of just one action radius is sufficient.

Colours belonging to the local colour gamut will be given a non-zero isolated modification. In order to guarantee a continuous transformation, the effect of a change of a particular selected colour and thus the modification $(\Delta x_1,\ldots \Delta x_n)$ to an original colour $(x_1,\ldots,x_n)$ within the local colour gamut, preferentially decreases in the direction of the border of the local colour gamut. This decreasing effect may be shaped as a Gaussian function, by a weight function given by the following equation:

$$w = e^{-\sum_{i=1}^{n}((x_i-\mu_i)/\sigma_i)^2} \quad (1)$$

As such, each component of the colour modification may be given as a weighted component of the colour change: $\Delta x_i = w \cdot \delta_i$. In other words, the colour modification $\Delta\vec{x}$ is proportional to the colour change $\vec{\delta}$, the proportionality factor being a weight as defined above: $\Delta\vec{x}=w\cdot\vec{\delta}$. An original colour $(x_1,\ldots,x_n)$ belonging to the local colour gamut will, by this modification $(\Delta x_1,\ldots \Delta x_n)$ be transformed to a modified colour $(x_1+\Delta_1,\ldots,x_n+\Delta x_n)$. The weight factor w in equation (1) is point symmetric with respect to the selected colour $\vec{\mu}=(\mu_1,\ldots,\mu_n)$.

If two different action radii have been defined, $\vec{\sigma}_l$ and $\vec{\sigma}_r$, then an asymmetric weight factor is obtained, and the above equation becomes:

$$w_\xi = e^{-\sum_{i=1}^{n}((x_i-\mu_i)/\sigma_{\xi i})^2} \quad (2)$$

where $\zeta$ equals l, if $x_i < \mu_i$ and $\zeta$ equals r, if $x_i \geq \mu_i$.

Instead of specifying the radii in the colour space in which the original colour image is given, it is preferred to specify the radii in another related space. A suitable space for this purpose is the Lch space. This allows to define the local colour gamut, comprising the colours to be modified, in a more intuitive and more useful way for an operator, using the selective colour correction system interactively. For the computation of the weight w or w$\zeta$, applicable to a specific original colour $(x_1,\ldots,x_n)$ comprised within the local colour gamut, a transformation from the native colour space $(x_1,\ldots,x_n)$ to the Lch colour space is necessary, in order to evaluate formulae (1) or (2). Also the selected colour $\vec{\mu}=(\mu_1,\ldots,\mu_n)$ must be transformed to the Lch colour space in order to evaluate w or w$\zeta$ in formula (1) or (2) respectively.

As is known in the art, the extent of the Gaussian function $e^{-z^2}$ is infinite, which would render the "local colour gamut" completely global. However, if for at least one colour component the absolute value of the difference $|x_i-\mu_i|>2\sigma_i$, then the value of the weight factor is forced to vanish to zero, such that the local colour gamut does not extend further than $2\sigma_i$ symmetrically around the selected colour $\vec{\mu}=(\mu_1,\ldots,\mu_n)$ The decreasing effect of the weight w may also be shaped by a piecewise linear weight function, which is zero outside the local colour gamut and is linearly ascending to reach the value 1 in the point corresponding to the selected colour $\vec{\mu}=(\mu_1,\ldots,\mu_n)$. In one dimension such a weight function may be denoted as:

$$w_{\mu\sigma}(x) = \frac{1}{\sigma}[(x-\mu+\sigma)_+ - 2(x-\mu)_+ + (x-\mu-\sigma)_+] \quad (3)$$

The function $y=z_+$ stands for $y=0$ if $z<0$ and $y=z$ if $z\geq 0$. This one-dimensional weight function $w_{\mu\sigma}(x)$ may be generalised to more dimensions in a rectangular way or in an ellipsoidal way. The difference between these two approaches is that the local colour gamut is a cuboid or an ellipsoid. In the cuboid case, the formula for the weight factor becomes:

$$w = \prod_{i=1}^{n} w_{\mu_i\sigma_i}(x_i) \quad (4)$$

In the ellipsoidal case, the formula becomes:

$$w = 1 - \sqrt{\sum_{i=1}^{n}\left(\frac{x_i-\mu_i}{\sigma_i}\right)^2} \quad (5)$$

wherein $\mu_i-\sigma_i\leq x_i\leq\mu_i+\sigma_i$, and $w=0$ if the right hand side of the equation is lower than zero. Both functions cause a local colour gamut, which does not extend further than $\sigma_i$ symmetrically around the selected colour $\vec{\mu}=(\mu_1,\ldots,\mu_n)$.

The decreasing effect may also be shaped by a piecewise cubic polynomial weight function, with everywhere continuous derivatives up to order 2, which is zero outside the local colour gamut and is ascending to reach the value 1 in the point corresponding to the selected colour $\vec{\mu}=(\mu_1,\ldots,\mu_n)$. Such a weight function is commonly known as a spline function and may be given by $g(z)=2.z^3-3.z^2+1$ for $z\geq 0$. For $z<0$ it is defined by the symmetrical function: $g(z)=-2.z^3-3.z^2+1$. If $z_i=(x_i-\mu_i)/\sigma_i$, the equations for the weights according to a rectangular or cuboid volume (equation 6) and ellipsoidal volume (equation 7) local colour gamuts are given respectively by:

$$w = \prod_{i=1}^{n} g(z_i) \quad (6)$$

$$w = g\left(\sqrt{\sum_{i=1}^{n} z_i^2}\right) \quad (7)$$

Also the local colour gamut established by these equations does not extend further than $\sigma_i$ symmetrically around the selected colour $\vec{\mu}=(\mu_1,\ldots,\mu_n)$.

In another preferred embodiment, the weight function may be shaped interactively by the operator. Preferentially, the weight function has the following restrictions:

$w(x_i)=0$ for $x_i$ outside the interval $[\mu_i-\sigma_i, \mu_i+\sigma_i]$ in the symmetrical case or $[\mu_i+\sigma_{li}, \mu_i+\sigma_{ri}]$ in the asymmetrical case;

$w(x_i)=1$ for $x_i=\mu_i$; and, $0 \leq w(x_i) \leq 1$ for $x_i$ inside the above mentioned intervals.

The operator may interactively shape the weight function in one dimension, for example by giving some control points, which may be used to define a Bezier curve (see Principles of Interactive Computer Graphics Second Edition, by W. Newman and R. Sproull, ISBN 0-07-046338-7 pages 315–318). Alternative ways for defining a weight curve may be used. By way of example, suitable weight functions are shown in FIG. 2 (58, 59, 60).

In case of asymmetric action radii, $\vec{\sigma}_l$ and $\vec{\sigma}_r$, the local colour gamut may be found by gluing together the associated sectors (octant in three dimensional colour space, hexadecant in four dimensional colour space, etc. . . . ).

The above equations give expressions for a weight factor w to be applied to the relative required colour change $\vec{\delta}$ to a selected colour $\vec{\mu}=(\mu_1,\ldots,\mu_n)$ in order to compute an isolated colour modification $\Delta \vec{x}$ to an original colour $\vec{x}=(x_1,\ldots,x_n)$, situated within the local colour gamut enclosing the selected colour.

If two or more colours ($\vec{\mu}_j$, j=1, . . . ) are selected, along with a required colour change ($\vec{\delta}_j$, j=1. . . ) for each and a local colour gamut for each, it is possible that two or more different local gamuts overlap each other in one or more common gamut regions. Any original colour $\vec{x}$, situated within such common gamut region, must get an isolated colour modification $\Delta \vec{x}_j$ according to each local colour gamut $\Lambda_j$ in which it resides. Therefore, within such a common gamut region, a combined colour modification $\Delta^* \vec{x}$ is computed by combination of the various isolated colour modifications $\Delta \vec{x}_j$. An absolute requirement is that the selected colours $\vec{\mu}_j$ get a combined colour modification $\Delta^* \vec{x} = \vec{\delta}_j$, in other words that each selected colour $\vec{\mu}_j$ gets exactly the colour change $\vec{\delta}_j$ required for it. Therefore, a weighted average, which is interpolating in the selected colours, is preferred. The combined colour modification $\Delta^* \vec{x}$ may be written as a weighted sum of the various isolated colour modifications $\Delta \vec{x}_j$ as in the following equation:

$$\Delta * \vec{x} = \sum_j w_j \cdot \Delta \vec{x}_j \qquad (8)$$

In the above equation, $W_j$ must be such that $w_j=\delta_{kj}$ if $\vec{x}=\vec{\mu}_k$. $\delta_{kj}$ is the Kronecker delta, which means that $\delta_{kj}=1$ if k=j and $\delta_{kj}=0$ if k≠j. In other words: all weights must be zero, except for the weight according to the required colour difference corresponding to the selected colour, which weight must have the value 1. A suitable weight function is given by the next equation:

$$w_j = \frac{\prod_{k=1,k\neq j}^{m} D_k}{\sum_{i=1}^{m} \prod_{k=1,k\neq i}^{m} D_k} = \frac{\frac{1}{D_j}}{\sum_{i=1}^{m} \frac{1}{D_i}} \qquad (9)$$

In the above equation, the range value m stands for the number of selected colours $\vec{\mu}_j$. The index j stands for a specific selected colour $\vec{\mu}_j$. $D_j$ is a distance between:

the original colour $\vec{x}$ to be modified or for which the combined colour modification is to be computed; and, a specific selected colour $\vec{\mu}_j$.

The distance function may be defined in several ways: as a Euclidian distance, as a sum or product of absolute values of the coordinate differences or as the maximum of such absolute values.

The last equation only holds if the original colour $\vec{x}$ does not coincide with a selected colour $\vec{\mu}_k$, because $D_k 0$ in that case.

In a more preferred embodiment, the combination method according to the previous two equations is improved in the following sense:

the effect on the weights $w_j$ for an original colour $\vec{x}$ of a required change on a selected colour $\vec{\mu}_k$, whose local colour gamut does not comprise the original colour $\vec{x}$, is eliminated. The inclusion of such a selected colour in the last equation would decrease the weight value $w_j$.

discontinuities in the weight function are avoided by a combination over the overlapping zones of local colour gamuts.

Preferentially, the following procedure is followed:

A. An original colour $\vec{x}$ is identified;

B. For each selected colour $\vec{\mu}_k$, a weight factor $w_k$ is computed, based upon the position of the original colour $\vec{x}$ with respect to the selected colour $\vec{\mu}_k$, and according to at least one action radius vector $\vec{\sigma}_k$, delimiting the corresponding local colour gamut $\Lambda_k$, and preferentially a positive function, which has a value 1.0 if $\vec{x}=\vec{\mu}_k$ and is non-ascending when the distance between the original colour $\vec{x}$ and the selected colour $\vec{\mu}_k$ increases in a specific direction. The weight factor $w_k$ is zero if the original colour $\vec{x}$ does not belong to the local colour gamut $\Lambda_k$;

C. The sum of all weight factors $W=\Sigma_k w_k$ is computed.

D. If $W \leq 1$, then the combined colour modification $\Delta^* \vec{x}$ is computed from the equation:

$$\Delta * \vec{x} = \sum_k W_k \cdot \vec{\delta}_k \qquad (10)$$

E. If W>1, then each weight $w_k$ is modified such that they sum to one, i.e. $\Sigma_k w_k=1.0$, and the above equation is applied.

The modification of $w_k$ may be done by dividing each value by W. In a more preferred embodiment, the modification of $w_k$ is such that values of $w_k$ which were close to one, remain to have a value close to one after modification, whereas weight values $w_k$ close to zero, get closer to zero. This method implies less computational overhead and avoids "dips" in the colour modifications.

In a preferred embodiment, new weights $z_j$ are obtained by multiplying each weight $w_j$ by a factor $[w_j/(1-w_j)]$, and dividing by a constant factor $\Sigma_k w_k/(1-w_k)$. Because $0 < w_j < 1$, the sum $T=\Sigma_j z_j < 1$. Again, new weights $w'_j$ are derived from $z_j$, such that the their sum $\Sigma_j w'_j = 1$ Therefore, the shortage $(1-T)$ is distributed over the weights $z_j$ to obtain $w'_j$, the sum of which is 1. In other words, if the sum of the original weights $w_j$ is greater than 1, then the weights $w_j$ are recalculated such that they will sum to 1. Therefore, first each new weight $z_j$ is calculated from the product of the original weight $w_j$ and its weighted average $[w_j/(1-w_j)]/[\Sigma_j w_j/(1-w_j)]$ with all the other weights. When summed, the new weights $z_j$ will usually total less than 1. So, the difference $(1-T)$ between the new total weight $T=\Sigma_j z_j$ and 1 is distributed among the final weights $w'_j$ based on a weighted average of the difference between the new weight $z_j$ and the original weight $w_j$.

The above described method assigns to each original colour a combined colour modification, which may be zero, or determined by one or more required colour changes. Such combined colour modifications applied to original colours define a colour transformation from the original colours to the modified colours. Thus, a modified colour from an original colour $\vec{x}$ is preferentially given by $\vec{x} + \Sigma_K W_K(\vec{x}) \vec{\delta}_K$, $K=1, \ldots N$. This equation applies for $N=1, 2$, etc. For $N=1$, the weighting function $W_K(\vec{x})$ may be simply a positive descending, or more generally non-ascending, function as $\vec{x}$ goes farther away from the selected colour $\vec{\mu}_K$. If $N \geq 2$, then each weighting function $W_K(\vec{x})$ may be influenced by another selected colour $\vec{\mu}_J$, $J \neq K$, if both selected colours are closer with respect to each other than some action radii. This colour transformation may be computed on original colours, whose colour values are situated on a regular grid defined in the colour space to which the colour values refer to. The thus computed colour transformation may be stored in a table or database and stored on a non-volatile medium, such as a hard disk. A suitable format for storing a colour transformation is a ColorLink, as defined within the FotoLook/FotoTune environment. The stored selective colour transformation may be recalled by an application program for application of the colour transformation to an original image. A suitable application program for applying a ColorLink to a digital continuous tone colour image is Photoshop equipped with a FotoTune plug-in. Tests have pointed out that applying the transformations, for selective colour correction, to an original colour image by making use of ColorLinks gives results which are comparable to direct application of the transformation formula above to the image.

Alternatively, the stored selective colour transformation may be retrieved for combination with another colour transformation. A suitable application program for performing such a combination is available in the Fototune/FotoLook environment, developed and marketed by Agfa-Gevaert N.V. This application program combines two or more ColorTags to deliver one ColorLink. This ColorLink may be successfully used to convert original image data to transformed image data, suitable to offer the stimulus values to an output device for generating colour separation films, printing plates, thermal dye colour images, etc. Colour separation films may be used to generate printing plates. Printing plates may be mounted on a press to generate printed copies of the colour image. The selective colour transformation may also be applied to a given link, e.g. between a device dependent RGB colour space and a device dependent CMYK colour space.

Ideally, the above equations should be evaluated using floating point arithmetic. Most of the calculations however may be done by using integer arithmetic, based on 32 bit precision. Some operations, like multiplication of function evaluation (exponentiation, spline function) may be performed by look-up table operations, using pre-calculated tables.

The relative colour changes $\vec{\delta} = (\delta_1, \ldots, \delta_n)$ may be represented by eight bit integer values.

The distance $D_j$ between an original colour $\vec{x}$ and a selected colour $\vec{\mu}_j$, or the square of it $D_j^2$ may be represented by a value between 0 and $2^{18}$.

The weight $w_j$, for weighting an isolated colour modification, may be represented by an integer value between 0 and 255, and is preferentially calculated by making use of look up tables, instead of using the analytical representation of the local colour gamut/decreasing function.

The algorithm for computing modified colour $\vec{y}$ from an original colour $\vec{x}$ may proceed as follows. First, the original colour $\vec{x}$ is converted from the native colour space to the corresponding HSL colour space, giving (h,s,l) colour values. If the native colour space was RGB, then the conversion is straight forward. If the native colour space is CMYK or CMY, then the original colour may first be converted to the RGB colour space. If the C, M and Y components are given as integer numbers ranging from 0 to 255, then the R, G and B components may be found by:

$$R=255-C,\ G=255-M,\ B=255-Y.$$

If also K is given, the above equations become:

$$R=255-C-K,\ G=255-M-K,\ B=255-Y-K$$

Any negative result R, G or B is clipped to zero. After this, the conversion to (h,s,l) is done. The R,G,B values that have a range from 0 to 255, are converted to h,s,l values which also range from 0 to 255. Then, for each selected colour $\vec{\mu}_j$, a suitable weight factor $w_j$ is computed by:

$$w_j = w_{jh}(h) * w_{js}(s) * w_{jl}(l) \quad (1)$$

As such the weighting function $W_j(\vec{x})$ is a scalar function of a colour vector $\vec{x} = (h,s,l)$. The notion scalar stresses the fact that the result of evaluation is one single value. This value is preferentially a real number in the interval [0.0,1.0]. In the above equation, $w_{jh}()$ represents the weight function along the hue axis for the selected colour $\vec{\mu}_j$, $w_{js}()$ represents the weight function along the saturation axis for the selected colour $\vec{\mu}_j$ and $w_{jl}()$ represents the weight function along the lightness axis for the selected colour $\vec{\mu}_j$. These functions are evaluated in the respective hue (h), saturation (s) and lightness (l) values of the original colour $\vec{x}$. Because the colour values h, s and l may be represented by values from 0 to 255, the three functions may be stored as three pre-computed look up tables, having 256 entries each. The pre-computation may be done according to the above sketched non-ascending functions (gaussian, linear, spline or user defined as shown in FIG. 2, numerals 58, 59, 60). Preferentially, these weight functions have been scaled up by a factor of 256 and quantised to integer numbers. The result of the multiplication is reduced to the interval [0,256] by division with 256*256.

If one $w_j$ equals one (represented by 256), this means that the original colour $\vec{x}$ coincides with the selected colour $\vec{\mu}_j$. In that case, the modified colour $\vec{y}$ is found by $\vec{y} = \vec{x} + \vec{\delta}_j$. The colour change $\vec{\delta}_j$ is preferentially given and stored in the same native colour space as the one in which the original colour $\vec{x}$ is given, such that the modified colour $\vec{y}$ is also found in the same native colour space. For integer arithmetic operations, this colour space is represented preferentially by coordinate values ranging from 0 to 255.

If all $w_j$ are smaller than 1, the sum of the weights $W=\Sigma_j w_j$ is computed. If the sum of the weights W is smaller than 1, then the modified colour $\vec{y}$ is found by $\vec{y} = \vec{x} + \Sigma_j w_j * \vec{\delta}_j$. After summation $\Sigma_j$, a division is done by the appropriate scaling factor (256), which was introduced for $w_j$.

If W is not smaller than 1, then the weights $w_j$ are modified to more appropriate weights $w'_j$ as described above, such that colour changes in colours, selected close to each other, would not add up to a larger colour modification for an original colour in their neighbourhood, and such that the colour modifications in the original colours have a continuous behaviour.

Instead of referring to a colour by its colour values within a specific colour space, any colour may also be referred to by a name, referred to as psychometric colour name, such as deep blue, dark red, pink, etc. These colour names may be converted via a data-base to Lab values or another suitable coordinate system.

The colour transformation may now be applied to the entire image or just to a delimited portion of it, called a subsection or regional selection. The thus transformed electronic image may be rendered on a photographic medium such as film or paper, or printed on paper via an electrographic or thermal dye printing process.

The principles of the method according to the current invention may be equally applied to duotone imagery. This type of images may be printed by two different inks, each ink having a controlled density distribution for representing an image. In that case, each colour may be defined in a colour space, characterising each colour by two colour values.

Having described in detail preferred embodiments of the current invention, it will now be apparent to those skilled in the art that numerous modifications can be made therein without departing from the scope of the invention as defined in the following claims.

Index of Reference Signs 21. original preview
22. corrected preview
23. list box
24. sequence number for selected colour
25. cyan colour value of selected colour
26. magenta colour value of selected colour
27. yellow colour value of selected colour
28. black colour value of selected colour
29. before field
30. cyan colour value of changed colour
31. magenta colour value of changed colour
32. yellow colour value of changed colour
33. black colour value of changed colour
34. after field
35. action radius for cyan component
36. action radius for magenta component
37. action radius for yellow component
38. action radius for black component
39. action radius field
40. total ink value for selected colour
41. total ink value for changed colour
42. add field
43. preview button field
44. delete field
45. apply field
46. red colour value of selected colour
47. green colour value of selected colour
48. blue colour value of selected colour
49. red colour value of changed colour
50. green colour value of changed colour
51. blue colour value of changed colour
52. action radius in direction of negative hue angle
53. action radius along a direction towards the origin of the saturation axis
54. action radius along negative direction of lightness axis
55. action radius in direction of positive hue angle
56. action radius along positive direction of saturation axis
57. action radius along positive direction of lightness axis
58. weight function applicable to difference in hue angle between original colour and selected colour
59. weight function applicable to saturation difference between original colour and selected colour
60. weight function applicable to lightness difference between original colour and selected colour
61. selected colour
62. changed colour
63. hue—saturation plane
64. lightness axis
65. projection of local colour gamut in hue—saturation plane
66. projection of local colour gamut on lightness axis
67. selected colour
68. changed colour $\vec{\mu} = (\mu_1, \ldots, \mu_n)$: selected colour $\vec{\delta}$: colour change $\vec{\sigma} = (\sigma_1, \ldots, \sigma_n)$: action radius vector $\vec{x} = (x_1, \ldots, x_n)$: original colour $\vec{y}$: modified colour $\Delta \vec{x} = (\Delta x_1, \ldots, \Delta x_n)$: colour modification $\Delta \vec{x}_j$: isolated colour modification $\Delta^* \vec{x}$: combined colour modification $\Lambda_j$: local colour gamut

We claim:

1. A method for selective correction of an original colour $\vec{x}$ in an original colour image, comprising the steps of:

selecting at least two different colours $\vec{\mu}_K$, K-1, ... N, N≧2, wherein each of the colours $\vec{\mu}_K$ represents a point in a n-dimensional colour space;

defining for each selected colour $\vec{\mu}_K$ a required colour change $\vec{\delta}_K$;

defining for each selected colour $\vec{\mu}_K$ a weighting function $W_K(\vec{x})$; and applying a colour modification to said original colour $\vec{x}$, according to $\Sigma_K W_K(\vec{x}) \vec{\delta}_K$, K=1, ... N wherein $W_K(\vec{\mu}_J)=0$ if K≠J and $W_K(\vec{\mu}_K)=1$.

2. Method according to claim 1, wherein each weighting function obeys the following inequalities in its range of definition: $0 \leq W_K(\vec{x}) \leq 1$.

3. Method according to claim 1, wherein the sum of all weighting functions, evaluated in any original colour $\vec{x}$, is not greater than one: $\Sigma_K W_K(\vec{x}) \leq 1$.

4. Method according to claim 1, wherein each weighting function $W_K(\vec{x})$ is defined by an extent and a shape.

5. Method according to claim 4, wherein said extent is defined by at least one action radius or by one or two action radii per coordinate axis, each action radius having said selected colour $\vec{\mu}_K$ as origin.

6. Method according to claim 5, wherein said action radius is defined in a colour space having HSL, HSV or Lch coordinate axes.

7. Method according to claim 4, wherein the extent is set to comprise all colours contributing to said selected colour.

8. Method according to claim 4, wherein the shape of the weighting function $W_K(\vec{x})$ is different for different coordinate axes.

9. Method according to claim 4, wherein said shape is based on the distribution of colours contributing to said selected colour.

10. Method according to claim 1, wherein
   a. said original colour $\vec{x}$,
   b. said selected colour $\vec{\mu}_K$,
   c. said required colour change $\vec{\delta}_K$, and
   d. said colour modification is defined in an RGB, Lab, CMY, CMYK, HiFi or named colour space, preferentially the same space for a, b, c and d.

11. Method according to claim 1, wherein said colour modification is combined with a global colour transformation, suitable for application to said original colour image.

12. Method according to claim 11, wherein said global colour transformation is defined on a sparse grid of colours.

13. Method according to claim 1, wherein said selected colour is obtained from said colour image.

14. Method according to claim 1, wherein said colour change $\vec{\delta}_K$ is obtained from the difference between:
   a desired colour selected on a reference colour image and said selected colour $\vec{\mu}_K$.

15. Method according to claim 1, wherein said weighting function $W_K(\vec{x})$ is not increasing as a distance $D_K$ between said original colour $\vec{x}$ and said selected colour $\vec{\mu}_K$ increases, as long as $D_K$ is smaller than a distance between said selected colour $\vec{\mu}_K$ and any different selected colour $\vec{\mu}_J$.

16. Method according to claim 1, wherein said weighting function $W_K(\vec{x})$ decreases according to a linear, quadratic, cubic, or gaussian function or is proportional to the inverse of a distance $D_K$ between said original colour $\vec{x}$ and the corresponding selected colour $\vec{\mu}_K$.

17. Method according to claim 1, wherein said selected colour and said required colour change are defined in a native colour space.

* * * * *